United States Patent [19]

Norris

[11] 4,211,112
[45] Jul. 8, 1980

[54] GASKETS FOR LIQUID LEVEL GAGES

[76] Inventor: Orlin R. Norris, 36 Reservoir Rd., Parsippany, N.J. 07054

[21] Appl. No.: 9,199

[22] Filed: Feb. 5, 1979

[51] Int. Cl.² ............................................. G01F 23/02
[52] U.S. Cl. ...................................................... 73/328
[58] Field of Search .................. 73/328, 329; 285/238

[56] References Cited
U.S. PATENT DOCUMENTS

| 630,047 | 8/1899 | Gilbert | 73/328 X |
|---|---|---|---|
| 833,784 | 10/1906 | Hicks | 73/328 X |
| 1,324,046 | 12/1919 | Hatfield | 73/328 X |
| 1,565,013 | 12/1925 | Jordan | 73/328 X |
| 1,605,226 | 11/1926 | Fricke, Sr. et al. | 73/328 |
| 3,358,510 | 12/1967 | Hoffmann et al. | 73/329 |
| 3,886,796 | 6/1975 | Gruett | 73/328 |

Primary Examiner—Gerald Goldberg
Assistant Examiner—Joseph W. Roskos
Attorney, Agent, or Firm—Omri M. Behr

[57] ABSTRACT

A sight gage for indicating the liquid level in a tank having tubular sight members includes a multipart sealing gland to prevent the gage from deteriorating because of corrosion and deposits appearing thereon.

10 Claims, 6 Drawing Figures

GASKETS FOR LIQUID LEVEL GAGES

BACKGROUND OF THE INVENTION

The present invention relates to seals for liquid level sight gages, and in particular, relates to a multi-part device fabricated of dissimilar materials to prevent leakage of the liquid.

The prior art abounds with different methods for mounting sight gages within connecting devices attached to a tank or reservoir which contains the water to be heated. Since the primary purpose of the sight gage is to indicate to the viewer the level of the water in the tank, it generally contains water and steam under pressure therein. The sight gage is generally located in close proximity to the boiler and comprises essentially a thick-walled transparent tube, which may be either glass or plastic, the upper end of which is connected to that portion of the boiler which is permanently in the vapor state and the lower end is connected to that portion of the boiler which always contains water. The sight gage itself is located at a level corresponding to that at which the water level of the boiler should be kept for satisfactory operation. It is the usual practice to provide valves to the upper, or steam connecting means, and the lower, or water connecting means. These valves are usually open at all times.

Criteria for such gages are well settled and will not be discussed herein. It will be clear to those skilled in the art that due to the high pressures and temperatures involved in steam boilers it is desirable to have a tight seal between the sight gage and the means connecting the gage to the boiler system. The seal generally utilized includes a rubber gasket and is compressed into place by the sealing nut. Unfortunately, it has been found in practice that under operating conditions it is virtually impossible to maintain an absolutely leak-proof seal due to the degregation of the gasket material. It is clearly impractical to replace the gasket as soon as it begins to deteriorate and it is impossible to maintain an adequate seal for a substantial period of time.

During operation, steam and water leak past the seal giving rise to three disadvantages. The first is the obscuring of the line of vision during the taking of the reading, another is the erosion of the surface of the sight gage and thirdly is the deposition thereon of previously dissolved solvent material. It has been found that unless these deposits are either prevented or immediately removed they will eventually cloud up the entire visibility of the glass. Corrosion is very hard on sight gages which utilize a transparent glass tube. This corrosion is caused by alkylinity and temperature. Most corrosion (thinning) on tubular glasses is above the water line at the upper half thereof. Here steam condenses and continually flows down the glass, eroding it. Boiler water with a pH of 11.5, for example, attacks glass 30 times faster than water with a pH of 8.5. The rate of attack from temperature increases 100 times from 265° to 500° F. When it is remembered that these sight gages are generally located at a height of about 14 feet about ground level in very close proximity of boilers operating at about 400° F. it will be realized that keeping these sight gages clean is no simple or safe proposition. The nature of this problem, of course, has been known for many years. Many attempts have been made to provide an approved seal between the sight gage and the associated connecting device.

The prior art discloses different methods and devices which attempted to solve this basic problem. In particular, U.S. Pat. No. 630,047 issued to Gilbert on Aug. 1, 1899, discloses a one-piece rubber gasket having a centrally disposed protrusion. The gasket is adapted to fit over the sight gage glass and be frictionally held thereupon. Centrally disposed on the gasket is the protruding circumferential flange portion. One end of the sight glass, with the gasket thereon, is inserted into the cooperating tube. A compression nut having an enlarged opening is fit over the open end of the sight glass and is threaded onto the tube with a shoulder portion of the nut coming into contact with the lower portion of the gasket protrusion. Thus, as the nut is tightened on the tube the gasket is compressed against the circumference of the tube glass holding it in position.

U.S. Pat. No. 833,784 issued to Hicks on Oct. 23, 1907, attempts to solve the same problem by utilizing a metal ring which is provided on its outer edge with a downwardly depending flange, thus, forming an annular recess into which is inserted a packing-ring of rubber or similar material which is circular in cross-section. The upper portion of the ring is provided with a groove into which is inserted a number of balls. The balls are retained within this groove or raceway by a second smaller washer placed thereabove and held in position by a upperly-projecting flange provided on the ring and is adapted to be rolled over a smaller ring holding it in position. Thus, the assembled gland formed permits a compression nut to be freely rotated, allowing the rubber gasket material to compress against the outer circumference of a tubular sight gage when installed. The only area in intimate contact with the sight gage is the compressed rubber material.

U.S. Pat. No. 1,324,046 issued Dec. 9, 1919, to Hatfield attempts to solve the same problem in a slightly different manner. Therein, the sight glass is cut or etched proximate the ends thereof to form a series of grooves equally spaced and circumferentially disposed. The compression nut compresses the packing into the grooves and along the outer peripheral edges thereby attempting to seal the sight gage glass to the cooperating fitting.

U.S. Pat. No. 3,886,796 issued to Gruett on June 3, 1975, discloses a more conventional sealing mechanism which includes a pair of O-rings in intimate contact with the inner diameter of the sight gage as well as the outer edge.

All of the above sealing devices have been found satisfactory for short periods of time. However, each of these devices tends to deteriorate rather rapidly, thus requiring replacement of the sight gage in order to maintain an accurate reading.

Therefore, it is an object of the present invention to provide a means for maintaining the clarity of the sight gage by providing a more permanent type of seal. It is another object of the present invention to provide a device which is inexpensive and readily seals the sight gage with a connecting means.

It is a further object of the present invention to provide a gasket for glands which may be used with boilers operating at temperatures in the vicinity of 500° F.

It is yet another object of the present invention to provide a gland which may last indefinitely and is ideally suited to the expansion and contraction characteristics of the sight gage.

SUMMARY OF THE INVENTION

A liquid level sight gage system for determining the level of liquid in a system utilizing a combination of liquids and gases at pressures exceeding atmospheric pressure, according to the principles of the present invention, comprises; a transparent tubular sight gage, first and second tubular connecting members, the first connecting member being connected at one end thereof to the system boiler, at a level above the liquid level, and at the other end thereof, to the tubular sight gage, the second connecting member being connected at one end thereof to the pressure system boiler, at a level below the normal liquid level, and at the other end thereof, to the other end of the tubular sight gage. Also included are first and second sealing glands for substantially preventing the leakage of gas, disposed between both ends of the tubular sight gage and the first and second connecting members. The sealing gland includes; a toroidally-shaped first member circumscribing the tubular sight gage, the inner diameter of the toroidally-shaped first member is in intimate contact with the circumference of the tubular sight gage prior to compression by the first and second connecting member, and a second member circumscribing the tubular sight gage, the second member being retained in position by the first member and coming into intimate contact with the circomference of the tubular sight gage upon compression by the connecting member.

The foregoing and other objects and advantages will appear from the description to follow. In the description reference is made to the accompanying drawing, which forms a part hereof, and in which is shown by way of illustration, specific embodiments in which the invention may be practiced. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described by way of example with reference to the accompanying drawing in which.

DESCRIPTION OF THE PREFERRED EMBODIMENT

Figure 1:
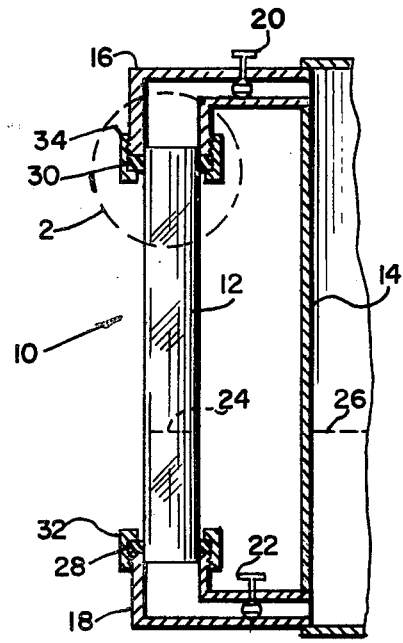
FIG. 1 shows a side elevational view of a system incorporating the principles of the present invention.

Referring now to FIG. 1, the system 10 of the present invention comprises a transparent, tubular sight gage 12, which may be fabricated of glass or suitable plastic, and is connected to a gas/liquid system 14 by means of a hollow gas lead connecting member 16 and a hollow liquid lead connecting members 18. Gas connecting member 16 is connected to that level of the system (boiler), which is always above the liquid level and liquid lead 18 is connected to the system at a level which is always below the operating liquid level in the system. The access of gas from the system to the gage is controlled by valve 20 and the access of liquid to the gage 12 is controlled by valve 22. When valves 20 and 22 are open, the liquid level 24 in the gage 12 is the same as the liquid 26 in the system (boiler) 14. Glands 28 and 30 are employed to sealably connect the gage glass 12 to connecting members 16 and 18. It is generally preferred to utilize the combination of sealing glands, in accordance with the principle of the present invention, and a device for holding and compressing same, such as nuts 32 and 34, which threadably engage connecting members 18 and 16, respectively.

Figure 2:
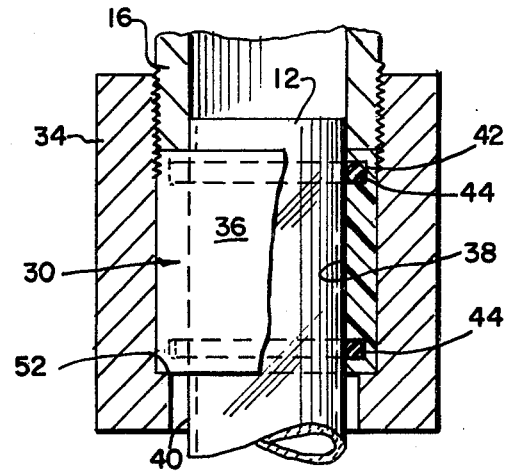
FIG. 2 is an enlarged cross-sectional view in elevation of the area shown within the dotted circle of FIG. 1.

FIG. 2 is an enlarged cross-sectional view, with the gland or gasket 30 partially broken away, of the area shown within the dotted line in FIG. 1. It is to be understood that, although the upper sealing gland 30 is to be described, that an identical sealing means 28 is found at the lower portion of the sight gage 12 when installed. The gland 30 includes a first element or member 36, which is preferably cylindrically shaped and whose diameter may range from less than to greater than its length. A centrally disposed aperture 38 along the longitudinal axis of gland 30 is provided. This aperture is adapted to receive the sight gage 12. The inner diameter of member 36 is in intimate contact with the circumference or outer surface 40 of the gage 12 prior to compression by the nuts 32 and 34. The member 36 is also provided with a channel 42 cut into the inner surface thereof proximate one or both ends thereof. The channel 42 is disposed perpendicular to the longitudinal axis of the element 36 and is adapted to receive a second member or element 44. Element 44 circumscribes the tubular sight gage 12 and is in contact with the outer surface thereof when compressed by the nut 34 as it threadably engages the connecting member 16.

Although the embodiment shown in FIG. 2 discloses the use of two second elements 44 disposed proximate either edge of element 36, it is also contemplated to use a single second element centrally disposed along the longitudinal axis of element 36 and perpendicular thereto.

Figure 3:
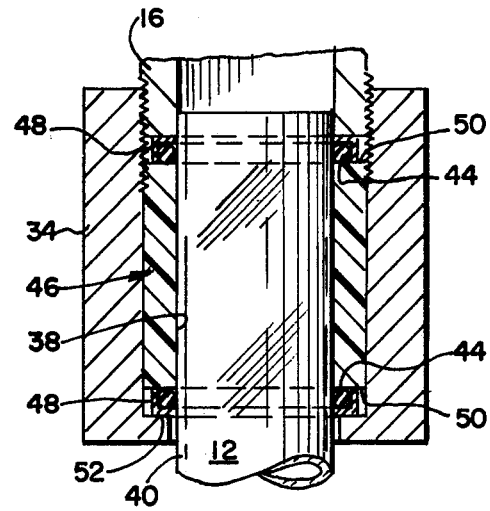
FIG. 3 is a cross-sectional view of an alternative embodiment of the gland shown in FIG. 2.

In the alternative embodiment of the present invention shown in FIG. 3, the gland or gasket 46 is provided with an L-shaped portion 48 extending above the edge 50 of the gasket 46. The L-shaped portion 48 is adapted to receive therein a second element 44, as shown in the earlier embodiment of FIG. 2. It is also to be noted that the gasket 46 may have either one or two L-shaped portions provided on the edges 50.

Figure 4:
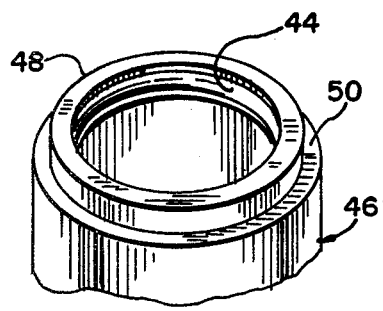
FIG. 4 is an isometric pictorial representation of the gasket shown in FIG. 3.

FIG. 4 is a perspective view of the embodiment shown in FIG. 3 and more clearly discloses the location of the second element 44 and the manner in which it is retained in the L-shaped portion 48. Here again it is only necessary that element 44 come into contact with the surface 40 of gage 12 when placed under compression by nut 34. The pressure to the gland 30 and 46 is caused by the extending portion 52 provided on the nut 34.

Figure 5:
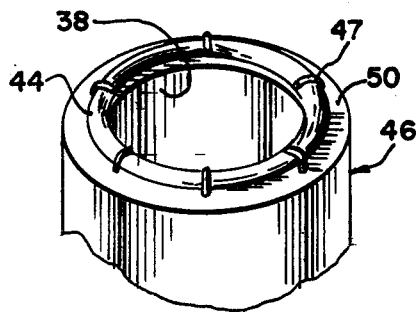
FIG. 5 is an isometric pictorial representation of another alternative embodiment of a sealing gasket.

Referring now to FIG. 5 which is a pictorial representation of an alternative embodiment similar to that shown in FIG. 3 and 4. In FIG. 5 the gland 46 is provided with a set of L-shaped fingers 47 disposed on the upper surface 50 thereof and held therein in a conventional manner. The fingers 47 are adapted to receive a second element 44 as in the earlier embodiments. Here again the fingers may be placed on the upper surface 50 or lower surface, not shown, of the gland 46.

Figure 6:
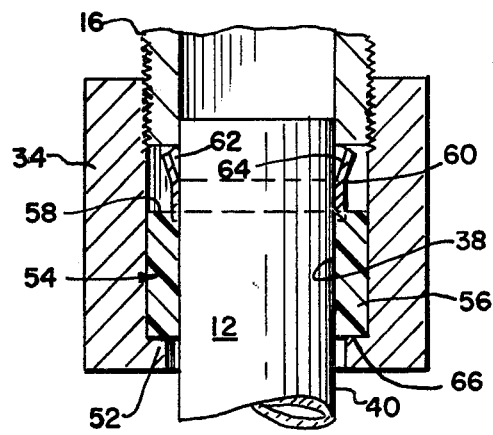
FIG. 6 is a cross-sectional view in elevational of yet another embodiment of the present invention.

Still another embodiment of the present invention is shown in FIG. 6 wherein the gland 54 is provided with a first element 56 having disposed therein a central aperture 38 adapted to receive a sight gage 12. Element 56 is adapted to be frictionally engaged and in intimate contact with the surface 40 of gage 12. Embedded in the surface 58 is an arcuate circumferentially disposed flange 60 which is retained in the element 56 in the conventional manner. The curve of the element 60 is such that a small space 62 is provided between the surface 40 and the inner wall 64 of the flange 60. With this type of gasket the first element 56 is placed on the sight gage 12 proximate the end thereof and a second material is poured into the air space 62 in a conventional manner. The second material is permitted to set or allowed to air dry prior to inserting the compression nut 34 thereon and threadably engaging it with connecting means 16. Here again, although one flange is shown, it is to be understood that a flange of similar construction may also be utilized on the bottom surface 66 of element 56.

The properties of the second element or member 44 appear to be most important in accomplishing the objects of the present invention. It has been determined that the material utilized for the second element 44 should have the properties of:

(a) not flowing at temperatures from approximately 250° to 400° F.;
(b) being compressible;
(c) being deformable under pressure;
(d) having the ability to maintain deformation once deformed (no memory);
(e) being capable of being elongated (stretchable);
(f) having excellent cohesion with a smooth surface such as glass or plastic; and
(g) resisting degradation when placed proximate to an environment of steam originally at temperatures from 250° to 400° F.

Examples of materials that may be used for the second element or member 44 are silicones, suitably silicone rubbers and caulks (when cured) such as RTV, silastic, etc. and flurocarbons such as polytetrafluorethylene, for example teflon in various configurations.

The nature of material utilized for the first element 30, 46 or 54 does not appear to be as critical as that utilized for the second material but should have the general properties of:

(a) being resilient, and
(b) being reasonably resistant to degradation when placed proximate to an environment of steam from 250° F. to 400° F.

The actual seal is provided by the interface of the retaining nut 34 and the first element on the one hand—which is a static seal and between the sight glass and the second element 44 on the other hand, which is a pseudo dynamic seal, the resistance to heat degradation of the first element need not be as high as that of the second element.

Examples of materials that may be used for the first element are buna N, neoprene, polyacrylate and ethylene-propylene.

Although the temperature of the steam in the boiler may reach 500° F. the steam appearing in the sight glass is much cooler since it is remote from the heated portion of the boiler and has been cooled by the surrounding atmosphere.

However, some surface degradation does occur to the first element which forms a thin insulator, thus preventing further degradation thereof. The second element sees still lower temperatures, since further cooling of the steam occurs, and since it can withstand higher temperatures than the first element it can more readily maintain its properties for long periods of time, thereby preventing the leakage of steam and the deterioration of the sight gage.

It is contemplated, that the second member may, if desired, be internally reinforced by support elements including, but not limited to fibrous materials such as jute string, asbestos string, fiber glass in string or fiber form, as well as, non-fibrous support elements such as wire. Composite second members of the foregoing type are included in the scope of the present invention provided that the portion of the second member contacting the sight glass has the properties (a-g) set forth above.

Hereinbefore has been disclosed a sealing gland capable of operation for an indefinite period of time in a sight gage. It will be understood that various changes in the details, materials, arrangement of parts and operating conditions which have been herein described and illustrated in order to explain the nature of the invention may be made by those skilled in the art within the principles and scope of the invention.

Having thus set forth the nature of the invention, what is claimed is:

1. A liquid level sight gage system for determining the level of liquid in a system utilizing the combination of liquids and gases at pressures exceeding atmospheric pressure comprising:
   (a) a transparent tubular sight gage;
   (b) first and second tubular connecting means, said first connecting means being connected at one end thereof to said system, at a level above the liquid level and at the other end thereof to said tubular sight gage, said second connecting means being connected at one end thereof to said pressure system at a level below the normal liquid level and at the other end thereof to the other end of said tubular sight gage;
   (c) first and second sealing means for substantially preventing the leakage of gas disposed between both ends of said tubular sight gage and said first and second connecting means; said sealing means including:
      (i) a toroidally-shaped first member circumscribing said tubular sight gage, the inner diameter of said toroidally-shaped first member being in intimate contact with the circumference of said tubular sight gage prior to compression by said first and second connecting means; and
      (ii) a second member circumscribing said tubular sight gage, said second member being retained by means provided by said first member and coming into intimate contact with the circumference of said tubular sight gage upon compression by said connecting means.

2. A liquid level sight gage system according to claim 1 wherein said first member is fabricated from the group of materials known as buna N, neoprene, polyacrylate or ethylene-propylene.

3. A liquid level sight gage system according to claim 1 wherein said second member is fabricated from the group of materials known as silicones or flurocarbons.

4. A liquid level sight gage system according to claim 1 wherein said first and second members are fabricated from different materials.

5. In gages for indicating the liquid level in a tank having tubular sight members held in position by compression nuts cooperating with engaging connector means compressing glands therebetween, the improvement wherein said gland comprises:
   (a) a toroidally-shaped first member circumscribing said tubular sight member, the inner diameter of said toroidally-shaped first member being in intimate contact with the circumference of said tubular sight member prior to compression by said compression nuts; and
   (b) a second member circumscribing said tubular sight member, said second member being retained by means provided by said first member and coming into intimate contact with the circumference of said tubular sight member upon compression by said compression nuts.

6. A gage according to claim 5 wherein said second member is poured into a space provided between said tubular sight member and said second member retaining means prior to positioning of said compression nuts.

7. A gage according to claim 5 wherein said second member is chosen from the group of materials known as silicones or flurocarbons.

8. A gage according to claim 5 wherein said first member is fabricated from the group of materials known as buna N, neoprene, polyacrylate or ethylene-propylene.

9. A gage according to claim 6 wherein said second member is fabricated from the group of materials known as silicones or flurocarbons.

10. A liquid level sight gage system according to claim 5 wherein said first and second members are fabricated from different materials.

* * * * *